(12) United States Patent
Neira Sarmiento et al.

(10) Patent No.: US 7,413,219 B2
(45) Date of Patent: Aug. 19, 2008

(54) AIRBAG WITH A DOUBLE REGULATING VENTING DEVICE

(75) Inventors: Flor Neira Sarmiento, Vigo (ES); Azucena Perez Garcia, Vigo (ES)

(73) Assignee: Dalphi Metal Espana, S.A., Madrid (ES)

( * ) Notice: Subject to any disclaimer, the term of this patent is extended or adjusted under 35 U.S.C. 154(b) by 393 days.

(21) Appl. No.: 11/238,829

(22) Filed: Sep. 29, 2005

(65) Prior Publication Data

US 2006/0197326 A1   Sep. 7, 2006

(30) Foreign Application Priority Data

Mar. 7, 2005   (EP) .................................. 05381012

(51) Int. Cl.
*B60R 21/239* (2006.01)
*B60R 21/28* (2006.01)
*B60R 21/16* (2006.01)
(52) U.S. Cl. .................................. 280/739; 280/728.1
(58) Field of Classification Search ............. 280/728.1, 280/739; *B60R 21/239, 21/28, 21/16*

See application file for complete search history.

(56) References Cited

U.S. PATENT DOCUMENTS

| 5,219,179 | A | * | 6/1993 | Eyrainer et al. | ............. | 280/739 |
| 5,603,526 | A | * | 2/1997 | Buchanan | .................... | 280/739 |
| 5,704,639 | A | * | 1/1998 | Cundill et al. | ............. | 280/739 |
| 6,056,318 | A | * | 5/2000 | Braunschadel | ............. | 280/739 |
| 2002/0014764 | A1 | * | 2/2002 | Anglsperger | ............. | 280/743.1 |
| 2004/0056459 | A1 | * | 3/2004 | Kassman et al. | ............. | 280/739 |
| 2007/0013177 | A1 | * | 1/2007 | Abe | ........................... | 280/739 |
| 2007/0246922 | A1 | * | 10/2007 | Manssart | .................... | 280/739 |

* cited by examiner

*Primary Examiner*—Christopher Ellis
*Assistant Examiner*—Jacob Meyer
(74) *Attorney, Agent, or Firm*—Ladas & Parry LLP

(57) ABSTRACT

An airbag comprising a bag (11) that can be inflated with the gas provided by a gas generator when the vehicle experiences a collision, with a venting device (13) comprising first a first gas discharge opening (15) and a sealing member (17) thereof intended to break due to the effect of the pressure inside the inflatable bag (11), and second a part (19) with a second opening (21) of a smaller surface area than the first opening (15), which is fixed to the inside portion of the inflatable bag (11) and of the sealing member (17), acting as an airbag venting area once the sealing member (17) of the first opening (15) breaks.

10 Claims, 1 Drawing Sheet

AIRBAG WITH A DOUBLE REGULATING VENTING DEVICE

FIELD OF THE INVENTION

The present invention refers to airbags which are used in automobiles to cushion blows experienced by drivers and passengers in the event of crashes or collisions, and more particularly to an airbag with a double regulating venting device.

BACKGROUND OF THE INVENTION

Airbags consist of frames in which there is fixed a folded bag which inflates rapidly by means of a gas produced by a generator when specific sensing devices detect that the vehicle has been involved in a collision. The bag is thus deployed, protecting the driver or a passenger, depending on his or her location, and prevents their bodies from impacting against any part of the vehicle.

When an airbag is activated, the main function is to restrain the occupant by exerting force against him or her which produces a deceleration. The airbag must maintain a certain degree of pressure during the collision of the occupant, and this pressure must be comprised between certain limits which allow complying with biomechanical parameters assuring the safety of the occupants, because otherwise the surface may be too hard and the occupants will bounce off, or it will be too soft and the occupants will impact against the vehicle.

The pressure of the bag depends on the amount of gas it houses inside. Once the airbag is activated, the generator expels all the gas, the only manner of controlling the amount of gas in the bag is by removing it.

Different proposals in this sense are known such as:

The use of more or less permeable fabrics for the bag of the airbag.

The demarcation of outlet areas by means of seams which break when a specific pressure or temperature is reached, leaving an area free for discharging the gases.

The incorporation of venting openings for discharging the gas, in some cases provided with different means of sealing the opening to achieve a better control of the internal pressure in the bag than that provided by the variation of the size of the opening, for example. Fabrics burning at a specific temperature or resilient membranes breaking at a specific pressure can be mentioned among these means. Patent applications WO02/096721, WO02/14115, and WO2004/056618 of the same applicant of the present invention belong to this category.

However, for the case of airbags in which small venting areas are required or for the case in which it is desirable to vary the venting area using the same sealing means, the mentioned proposals do not solve the problem of suitably controlling the pressure of the gas inside the bag.

The present invention is aimed at solving this problem.

SUMMARY OF THE INVENTION

According to the invention, the venting device of the inflatable bag of the airbag on one hand comprises, like other devices known in the art, a gas discharge opening and a sealing member thereof intended for rupturing due to the effect of the internal pressure in the inflatable bag. On the other hand, and according to the invention, the device also comprises a part with a second opening of a smaller surface area than the first one joined to the inside portion of the inflatable bag and to the sealing member by means of an adhesive member such that the second opening is surrounded by the fist one and acts as a venting area of the device once the sealing member of the first opening breaks.

Therefore, the venting device according to the present invention provides both the function of a venting device regulated by the internal pressure of the inflatable bag and the function of a venting device regulated by the venting area. The device remains closed as long as the sealing member does not break and when this occurs, the gas discharge through the surface of said second opening is regulated.

The two regulating possibilities mentioned are thus provided for airbags in which the reduced size of the required venting area would make it impossible to use sealing members intended for breaking when the internal pressure of the bag reaches a specific limit or, apart from the size, to change the venting area by using the same sealing member.

Other features and advantages of the present invention will be understood from the following detailed description of an illustrative and by no means limiting embodiment of its object in relation to the enclosed drawings.

DETAILED DESCRIPTION OF THE INVENTION

Figure 1:
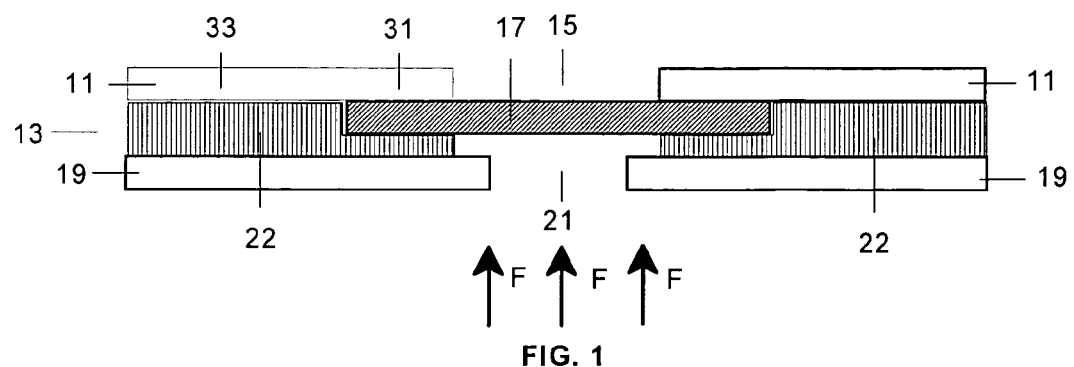
FIGS. 1-4 show cross sectional schematic views of four embodiments of the venting device for the inflatable bag of an airbag according to the present invention.

In the four embodiments shown in FIGS. 1-4, it can be observed that the venting device 13 according to the present invention is formed by a first opening 15 made in the bag 11 sealed by member 17, which can be a silicone patch, for example, having both a variable or a constant thickness, and part 19 fixed to the sealing member 17 and/or to the bag 11, with a second opening 21 of a smaller surface area than the first opening 15 and which must be located inside a hypothetical projection of the first opening 15 in part 19.

The arrows F show the direction of the gas flow into the inflatable bag 11.

As a merely illustrative example, it can be considered that the opening 15 has 40 mm in diameter, that opening 21 has 20 mm in diameter and that the sealing member is sized for a burst pressure of 200 mbar.

The basic differences between the four embodiments refer to the manner of joining their members and, as the case may be, the process for putting it into practice.

In the embodiment shown in FIG. 1, a two-sided adhesive member 22 is used to fix part 19 in part to the sealing member 17 and in part to area 33 of the inflatable bag 11 contiguous to area 31, which is simply placed against the sealing member 17 as there is no adhesive member between them.

Figure 2:
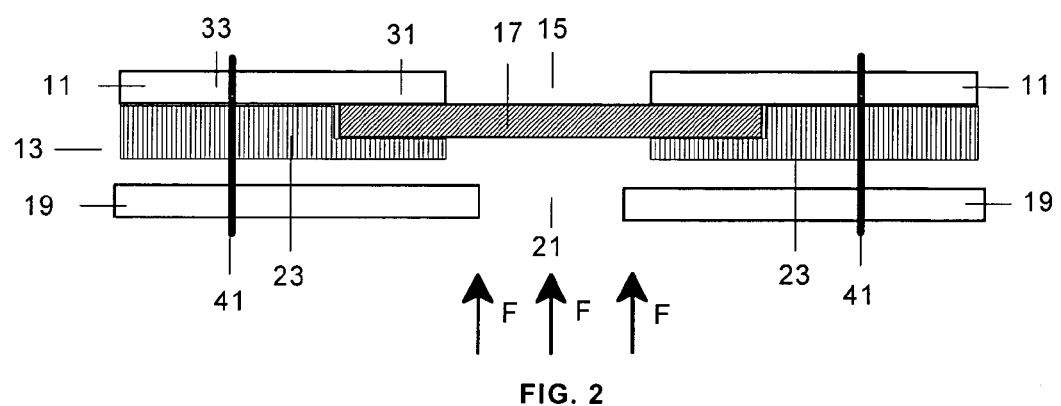

In the embodiment shown in FIG. 2, first a one-sided adhesive member 23 is used to fix the sealing member 17 to the bag 11, and second, part 19 is fixed to the previous subassembly by means of stitching 41 in area 33 of the inflatable bag 11 contiguous to area 31, which is simply placed against the sealing member 17 as there is no adhesive member between them.

FIG. 2 shows part 19 separated from the adhesive member 23 for a better illustration, but it would logically be joined to it when said stitching operation is carried out.

Figure 3:
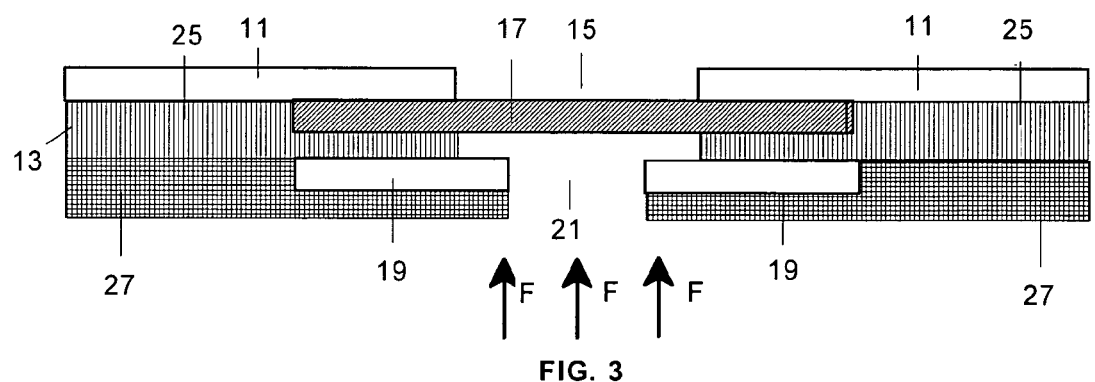

In the embodiment shown in FIG. 3, a first one-sided adhesive member 25 is used to fix the sealing member 17 to the bag 11 and a second adhesive member 27 is used to fix part 19 to the first adhesive member 25.

Figure 4:
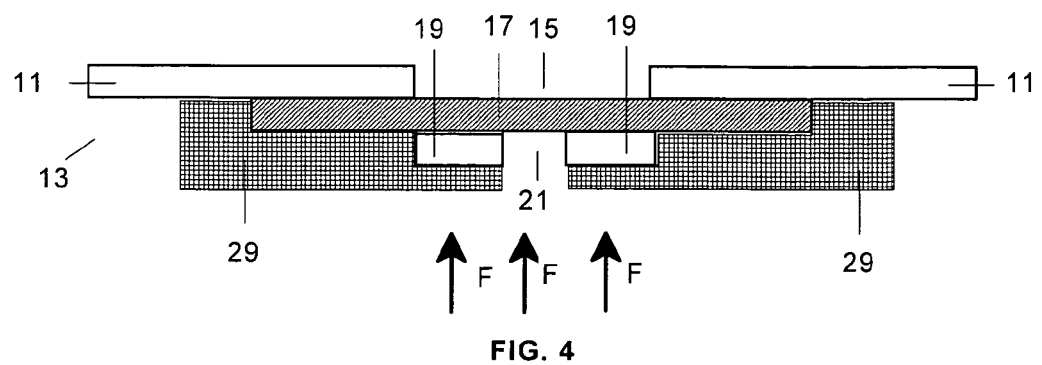

In the embodiment shown in FIG. 4, part 19 has the shape of a circular ring, its outer diameter coincides with that of the first opening 15 and is fixed to the bag 11 by means of an only one-sided adhesive member 29, which is also of use in fixing the sealing member 17 to the inflatable bag 11.

The following advantages can be mentioned among those of the present invention:

- The functions of gas discharge and control of the gas pressure inside the bag are independent from one another.
- There is greater flexibility in the design of the bag, and changes relating to the gas discharge function are particularly facilitated.
- It allows the use of a single sealing member for several types of venting devices, which implies a reduction of the running time thereof and a cost reduction.

With respect to the described embodiments of the invention those modifications comprised within the scope defined by the following claims may be introduced.

The invention claimed is:

1. An airbag comprising a bag (11) that can be inflated with the gas provided by a gas generator when the vehicle experiences a collision, having at least one venting device (13) comprising a first gas discharge opening (15) and a sealing member (17) thereof intended for breaking due to the effect of the internal pressure in the inflatable bag (11), characterized in that the venting device (13) further comprises a part (19) with a second opening (21) of a smaller surface area than the first opening (15), which is fixed to the inside portion of the inflatable bag (11) and of the sealing member (17) such that the second opening (21) is located inside a hypothetical projection of the contour of the first opening (15) in part (19) and can act as a venting area of the venting device (13) once the sealing member (17) of the first opening (15) breaks.

2. An airbag according to claim 1, characterized in that the sealing member (17) is a silicone patch.

3. An airbag according to claim 2, characterized in that the silicone patch has a constant thickness.

4. An airbag according to claim 2, characterized in that the silicone patch has a variable thickness.

5. An airbag according to claim 1, characterized in that part (19) is fixed by means of a two-sided adhesive member (22) in part to the sealing member (17) of the first opening (15) and in part to an area (33) of the inflatable bag (11) contiguous to area (31) placed against said sealing member (17).

6. An airbag according to claim 1, characterized in that part (19) is fixed by means of stitching (41) to an area (33) of the inflatable bag (11) contiguous to area (31) placed against the sealing member (17) of the first opening (15), the sealing member (17) being fixed to the inflatable bag (11) by means of a one-sided adhesive member (23).

7. An airbag according to claim 1, characterized in that the sealing member (17) is fixed to the bag (11) by means of a first one-sided adhesive member (25), and part (19) is fixed to said first adhesive member (25) by means of a second one-sided adhesive member (27).

8. An airbag according to claim 1, characterized in that the first and second openings (15, 21) have a circular shape.

9. An airbag according to claim 8, characterized in that part (19) has a circular ring shape, its outer diameter coincides with the diameter of the first opening (15) and is fixed to the bag (11) by means of a one-sided adhesive member (29), which is also used to fix the sealing member (17) to the inflatable bag (11).

10. An airbag according to claim 1, characterized in that part (19) is carried out in the same material as the inflatable bag (11).

* * * * *